United States Patent
Kim et al.

(10) Patent No.: US 8,260,346 B2
(45) Date of Patent: Sep. 4, 2012

(54) MULTI-MODE MOBILE TERMINAL AND COMMUNICATION METHOD FOR MANUAL NETWORK SELECTION

(75) Inventors: Woo Seong Kim, Gwangmyeong-si (KR); Seung Jin Ahn, Gunpo-si (KR); Jee Young Song, Anyang-si (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 12/210,817

(22) Filed: Sep. 15, 2008

(65) Prior Publication Data

US 2009/0163195 A1   Jun. 25, 2009

(30) Foreign Application Priority Data

Dec. 24, 2007   (KR) .................... 10-2007-0136243

(51) Int. Cl.
*H04M 1/00*   (2006.01)
*H04W 4/00*   (2009.01)
*H04W 40/00*   (2009.01)

(52) U.S. Cl. .................. 455/552.1; 455/435.2; 455/448
(58) Field of Classification Search .................. 455/448, 455/552.1, 435.2
See application file for complete search history.

(56) References Cited

U.S. PATENT DOCUMENTS

| | | | |
|---|---|---|---|
| 7,483,984 B1 * | 1/2009 | Jonker et al. ................... | 709/226 |
| 2005/0037755 A1 * | 2/2005 | Hind et al. .................. | 455/435.3 |
| 2005/0090255 A1 * | 4/2005 | Kuchibhotla et al. ....... | 455/435.2 |
| 2005/0107109 A1 * | 5/2005 | Gunaratnam et al. ......... | 455/525 |
| 2005/0233749 A1 * | 10/2005 | Karaoguz et al. ............. | 455/442 |
| 2006/0030321 A1 * | 2/2006 | Choi .......................... | 455/435.2 |
| 2007/0165583 A1 * | 7/2007 | Pecen ........................... | 370/338 |
| 2007/0218903 A1 * | 9/2007 | Grech .......................... | 455/436 |
| 2008/0113683 A1 * | 5/2008 | Paas et al. .................. | 455/552.1 |
| 2010/0004019 A1 * | 1/2010 | Di Caprio et al. ......... | 455/552.1 |

* cited by examiner

*Primary Examiner* — Nick Corsaro
*Assistant Examiner* — Edd Rianne Plata
(74) *Attorney, Agent, or Firm* — Birch, Stewart, Kolasch & Birch, LLP (57) ABSTRACT

A multimode mobile terminal and communication method thereof are discussed, by which communication is enabled using various networks. The method according to an embodiment includes a display unit configured to display a plurality of currently available networks detected by the terminal, each network being a different network type, a user input unit configured to generate a selection signal for a specific network of the plurality of currently available networks in response to a user input, a controller operatively connected to the display unit and user input unit and configured to control communication carried out via the specific network selected via the user input unit, and a wireless communication unit operatively connected to the controller and configured to carry out the communication via the specific network.

16 Claims, 9 Drawing Sheets

MULTI-MODE MOBILE TERMINAL AND COMMUNICATION METHOD FOR MANUAL NETWORK SELECTION

CROSS REFERENCE TO RELATED APPLICATIONS

This application claims the benefit of the Korean Patent Application No. 10-2007-0136243, filed on Dec. 24, 2007, which is hereby incorporated by reference as if fully set forth herein.

BACKGROUND OF THE INVENTION

1. Field of the Invention

The present invention relates to a mobile terminal, and more particularly, to a multimode mobile terminal and communication method thereof.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Meanwhile, networks capable of performing communication using a mobile terminal have been recently diversified. Hence, many efforts have been made to research and develop mobile terminals capable of performing communication using various networks.

SUMMARY OF THE INVENTION

Accordingly, the present invention is directed to a multimode mobile terminal and communication method thereof that substantially obviate one or more problems due to limitations and disadvantages of the related art.

An object of the present invention is to provide a multimode mobile terminal and communication method thereof, by which communication is enabled using various networks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multimode mobile terminal according to the present invention includes a display displaying one or more currently available networks, a user input unit for inputting a selection signal for a specific one of one or more currently available networks, a controller controlling communication to be carried out via the specific network selected by the user input unit, and a wireless communication unit carrying out the communication via the selected network under a control of the controller.

In another aspect of the present invention, a communication method of a multimode mobile terminal includes displaying one or more currently available networks, receiving an input of a selection signal of a specific one of the one or more currently available networks, and carrying out communication via the selected specific network.

One skilled in the art will understand that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 9(*a*) and 9(*b*) are diagrams of a screen on which strength of a signal per a service used for data communication in a mobile terminal according to one embodiment of the present invention is displayed;

FIGS. 10(*a*) and 10(*b*) are diagrams of a screen to explain an example of setting a priority of a network applicable to a specific service in a mobile terminal according to one embodiment of the present invention;

DETAILED DESCRIPTION OF THE INVENTION

Reference will now be made in detail to the preferred embodiments of the present invention, examples of which are illustrated in the accompanying drawings. One skilled in the art will understand that other embodiments may be utilized, and structural, electrical, as well as procedural changes may be made without departing from the scope of the present invention. Wherever possible, the same reference numbers will be used throughout the drawings to refer to the same or like parts.

Figure 1:
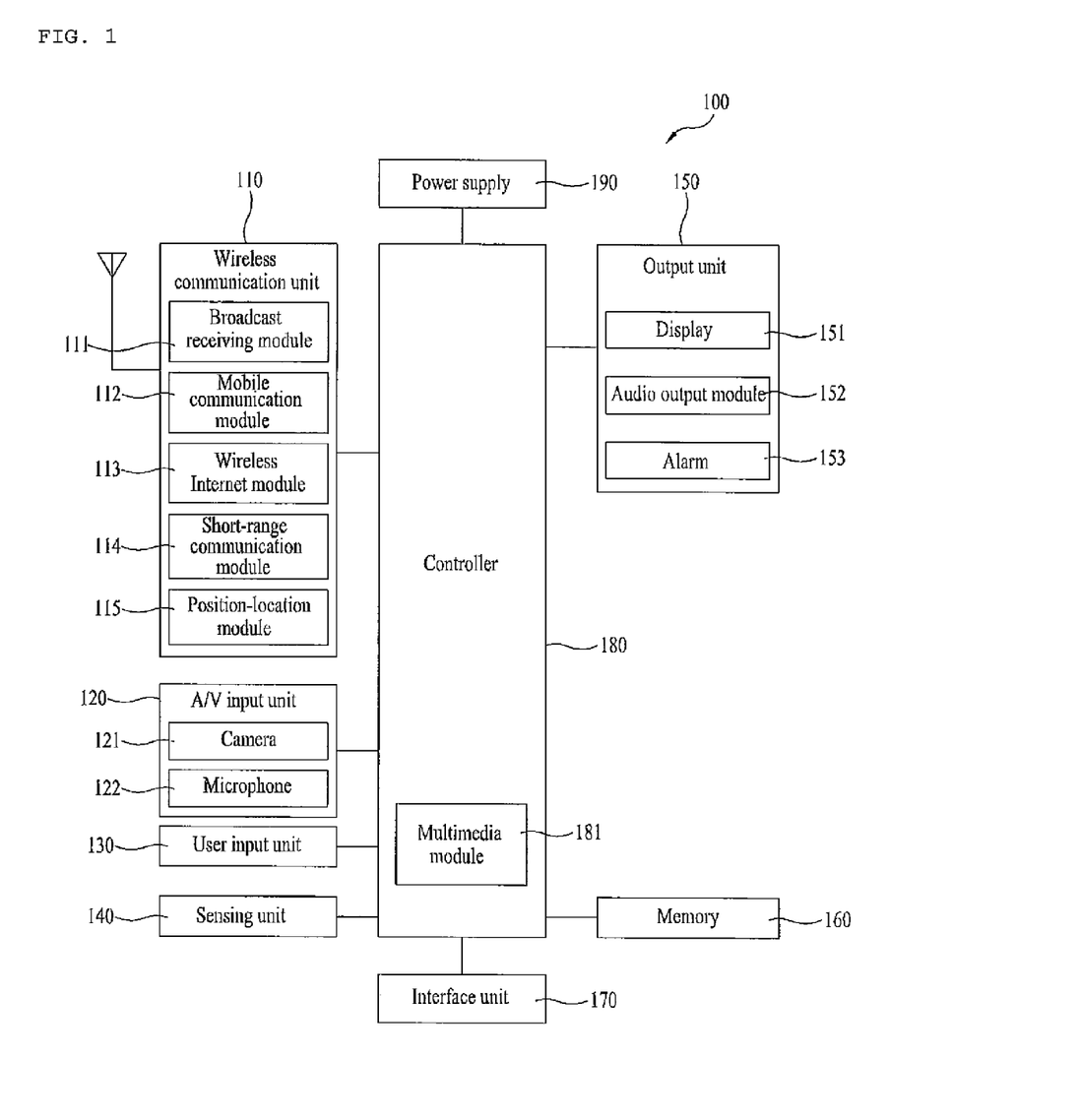
FIG. 1 is a block diagram of a mobile terminal in accordance with an embodiment of the present invention.

FIG. 1 is a block diagram of a mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but one skilled in the art will understand that implementing all of the illustrated components is not a requirement. Greater or fewer components may alternatively be implemented.

FIG. 1 shows a wireless communication unit 110 included in the mobile terminal 100 and configured with several commonly implemented components. For instance, the wireless communication unit 110 typically includes one or more components which permits wireless communication between the mobile terminal 100 and a wireless communication system or network within which the mobile terminal is located.

The broadcast receiving module 111 included in the mobile terminal 100 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 included in the mobile terminal 100 transmits/receives wireless signals to/from one or more network entities (e.g., base station, Node-B). Such signals may represent audio, video, multimedia, control signaling, and data, among others.

The wireless internet module 113 included in the mobile terminal 100 supports Internet access for the mobile terminal. This module may be internally or externally coupled to the terminal.

The short-range communication module 114 included in the mobile terminal 100 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 included in the mobile terminal 100 identifies or otherwise obtains the location of the mobile terminal. If desired, this module may be implemented using global positioning system (GPS) components which cooperate with associated satellites, network components, and combinations thereof.

The audio/video (A/V) input unit 120 included in the mobile terminal 100 is configured to provide audio or video signal input to the mobile terminal. As shown, the A/V input unit 120 includes a camera 121 and a microphone 122. The camera receives and processes image frames of still pictures or video.

The microphone 122 included in the mobile terminal 100 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in a memory 160, utilized by an output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 included in the mobile terminal 100 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 of the mobile terminal 100 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 of the mobile terminal 100 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. One skilled in the art will understand that the various output provided by the components of output unit 150 may be separately performed, or such output may be performed using any combination of such components.

The memory 160 of the mobile terminal 100 is generally used to store various types of data to support the processing, control, and storage requirements of the mobile terminal 100. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 included in the mobile terminal 100 typically controls the overall operations of the mobile terminal 100. For instance, the controller 180 performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the mobile terminal 100. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
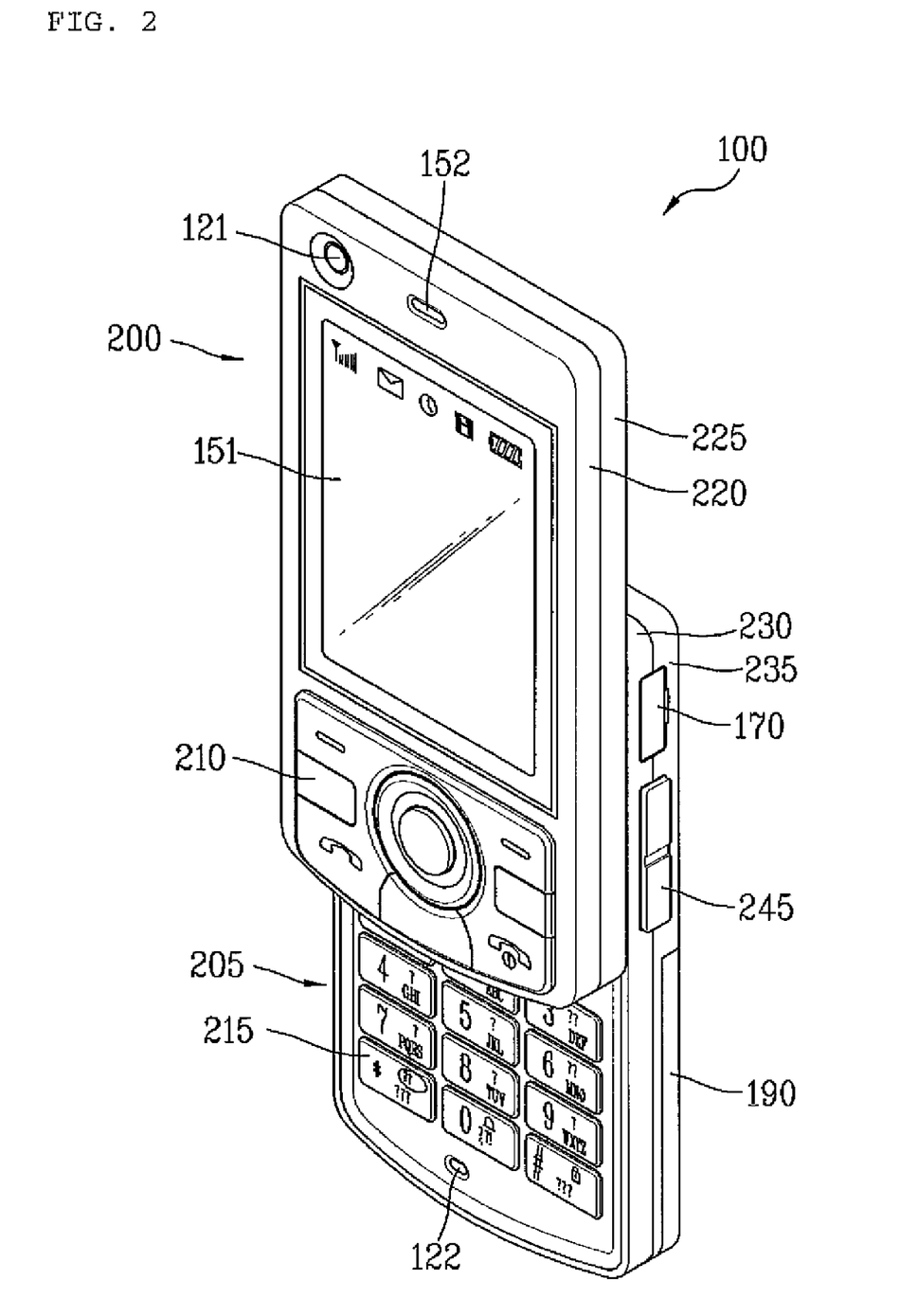
FIG. 2 is a perspective view of a front side of a mobile terminal according to an embodiment of the present invention.

FIG. 2 is a perspective view of a front side of a mobile terminal 100 according to an embodiment of the present invention. The mobile terminal 100 of FIG. 2 can have the same or similar components as the mobile terminal 100 of FIG. 1.

In FIG. 2, the mobile terminal 100 includes a first body 200 configured to slideably cooperate with a second body 205. The user input unit (described in FIG. 1) is implemented using function keys 210 and keypad 215. The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal.

The first body 200 slides relative to the second body 205 between open and closed positions. In the closed position, the first body 200 is positioned over the second body 100 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 includes a first case 220 and a second case 225, and the second body 205 includes a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 includes a camera 121 and audio output unit 152, which is configured as a speaker, positioned relative to the display 151. If desired, the camera 121 may be constructed in such a manner that the camera 121 can be selectively positioned (e.g., rotated, swiveled, etc.) relative to the first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

The second body 205 includes a microphone 122 positioned adjacent to the keypad 215, and side keys 245, which are one type of a user input unit, positioned along the side of the second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
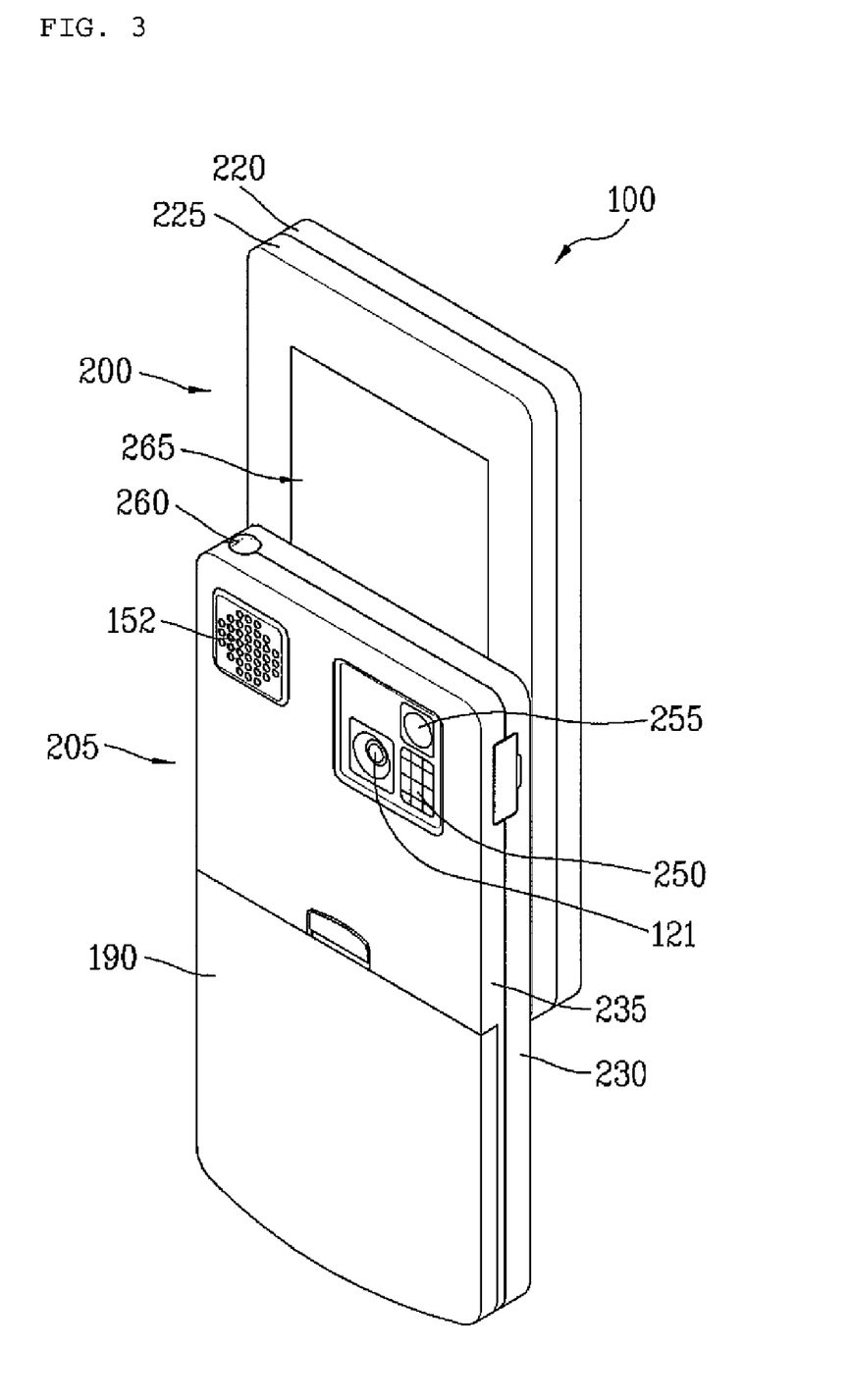
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body 205. The mirror 255 is useful for assisting a user to position the camera 121 in a self-portrait mode. The camera of the second body 205 faces a direction which is opposite to a direction faced by camera 121 of the first body 200 (FIG. 2). Each of the cameras 121 of the first and second bodies 200, 205 may have the same or different capabilities.

In an embodiment, the camera 121 of the first body operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. The antenna 260 functions in cooperation with the broadcast receiving module 111 (FIG. 1). If desired, the antenna 260 may be fixed or configured to retract into the second body 205. The rear side of the first body 200 includes a slide module 265, which slideably couples with a corresponding slide module located on the front side of the second body 205.

One skilled in the art will understand that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1 to 3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the tong term evolution (LTE) of the UMTS, and the global system for mobile communications (GSM). By way of non-limiting example only, further description will relate to a CDMA communication system, but such teachings apply equally to other system types.

Figure 4:
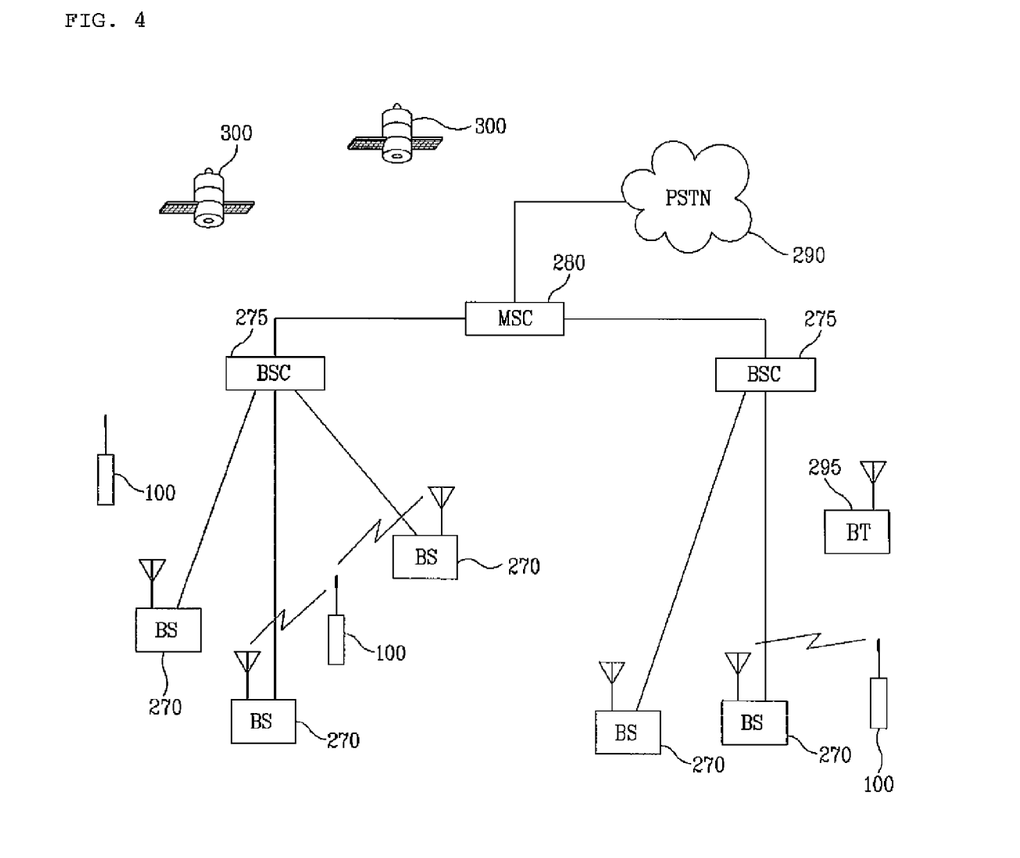
FIG. 4 is a block diagram of a CDMA wireless communication system operable with the mobile terminal of FIGS. 1 to 3.

Referring now to FIG. 4, a CDMA wireless communication system includes a plurality of mobile terminals 100, a plurality of base stations 270, base station controllers (BSCs) 275, and a mobile switching center (MSC) 280. All components of the communication system are operatively coupled and configured. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or XDSL. One skilled in the art will understand that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals (or mobile terminal) 100. Two satellites are depicted, but one skilled in the art will understand that useful positioning information may be obtained with greater or fewer satellites. The position-location module 115 (FIG. 1) of the portable terminal 100 is typically configured to cooperate with the satellites 300 to obtain desired position information. One skilled in the art will recognize that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC 275 provides call resource allocation and mobility management functionality including the orchestration of soft handoffs between base stations 270. The BSCs 275 also route the received data to the MSC 280, which provides additional routing services for interfacing with the PSTN 290. Similarly, the PSTN 290 interfaces with the MSC 280, and the MSC interfaces with the BSCs 275, which in turn control the base stations 270 to transmit sets of forward-link signals to the mobile terminals 100.

In the following description, a communication method of a mobile terminal according to one embodiment of the present invention is explained. The mobile terminal 100 according to one embodiment of the present invention is a multimode mobile terminal. The multimode mobile terminal is a mobile terminal capable of performing communication via a plurality of networks. In particular, the multimode mobile terminal is a terminal that supports a plurality of communication systems simultaneously. For instance, the multimode mobile terminal includes a DBDM (dual-band dual-mode) terminal. In particular, the DBDM terminal means a terminal capable of simultaneously performing communication on two frequency bands (e.g., 2.1 GHz band of WCDMA and 1.8 GHz band of CDMA) using two modems.

And, the multimode mobile terminal includes a TBTM (triple-band triple-mode) terminal. In particular, the TBTM terminal means a terminal capable of performing communication by supporting three communication systems simultaneously. For instance, the TBTM terminal is able to perform communication via GSM (global system for mobile telecommunication) network, WCDMA (wideband code division multiple access) network, or LTE (long term evolution) network.

For clarity and convenience of description, the present description assumes that the mobile terminal 100 includes the TBTM terminal simultaneously applicable to GSM, LTE and WCDMA networks.

Figure 5:
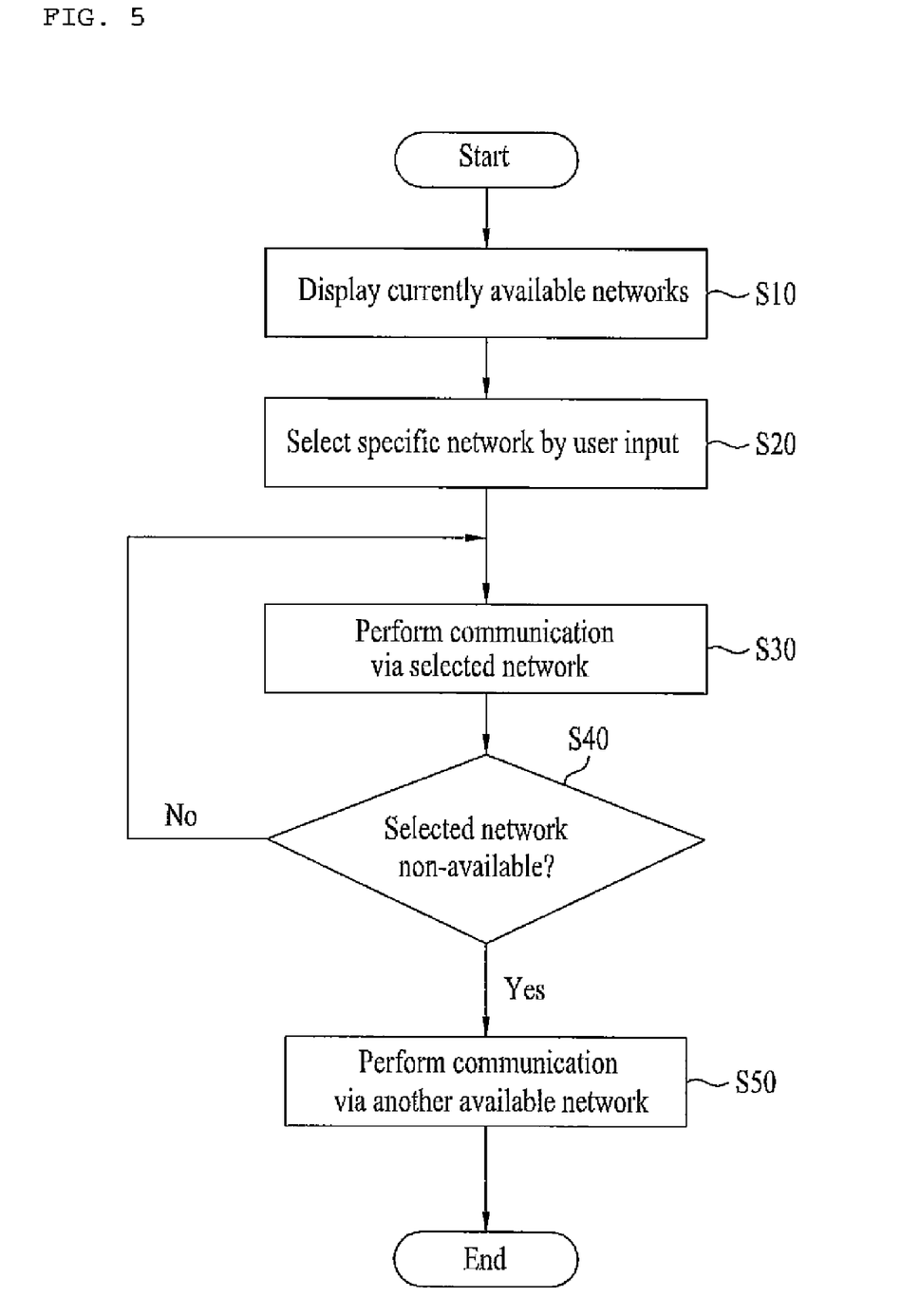
FIG. 5 is a flowchart for explaining a method of performing data communication in a mobile terminal according to one embodiment of the present invention.

FIG. 5 is a flowchart for a method of performing data communication in a mobile terminal according to one embodiment of the present invention.

Referring to FIG. 5, a mobile terminal 100 according to one embodiment of the present invention is capable of performing communication via a plurality of networks. And, the controller 180 is able to display a currently available network [S10]. In particular, the mobile terminal 100 can be located within a plurality of networks and the controller 180 is able to display a currently available network on the display 151.

Figure 6:
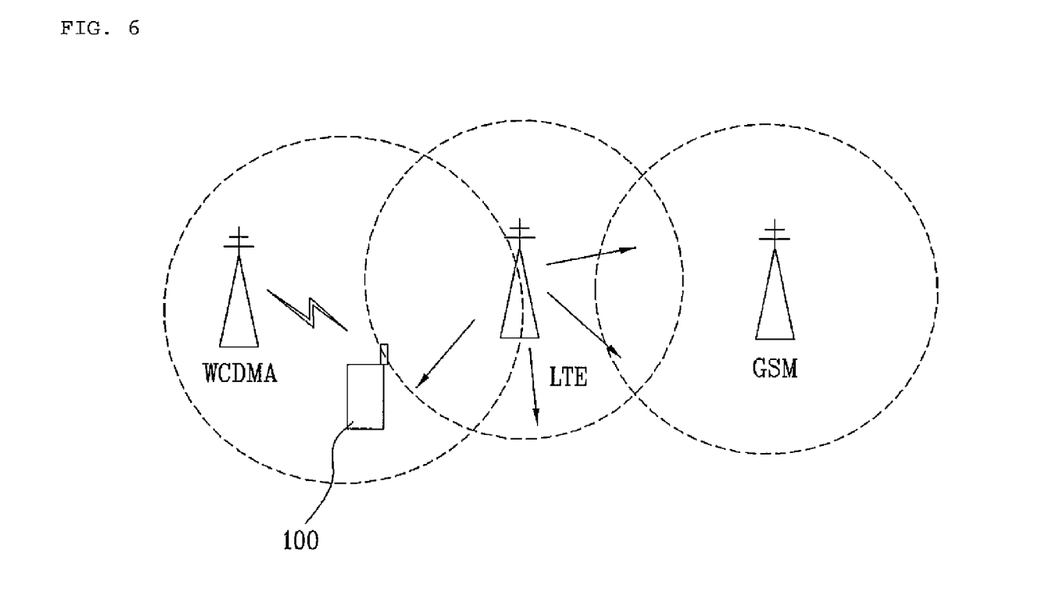
FIG. 6 is a diagram to explain a state that a mobile terminal according to one embodiment of the present invention is located within a plurality of networks.

FIG. 6 is a diagram to explain a state that a mobile terminal according to one embodiment of the present invention is located within a plurality of networks.

Referring to FIG. 6, a mobile terminal 100 is located within networks including GSM, LTE and WCDMA. The mobile terminal 100 is able to match a period for communication with a base station based on an idle cycle. In this case, the idle cycle means that an active time for the mobile terminal to exchange data with the base station and an idle time for the mobile terminal not to exchange data with the base station are periodically repeated. In case that a strength of signals transceived between the mobile terminal 100 and the base station at the GSM network is very weak or signals are not transceived in-between, the GSM network is not currently available for the mobile terminal 100.

To match synchronization with the base station, the mobile terminal 100 is able to use a random access channel (RACH). In this case, the random access channel (RACH) is used to access a network when a terminal fails to establish uplink synchronization with a base station. Major functionality of the RACH can be divided into a function that a terminal conducts a downlink synchronization and then accesses a first base station (i.e., initial ranging or initial access) and a function that a terminal periodically accesses the base station while accessing the network (i.e., periodic ranging).

The initial ranging is used when a terminal is to be provided with synchronization and a necessary ID in accessing a network. And, the periodic ranging for accessing RACH after the initial ranging is used when there exists a transport packet to be transmitted or is used to initialize a protocol to receive information from a base station.

The use of the periodic ranging in 3GPP LTE can be divided into two types. In particular, periodic ranging in 3GPP LTE is divided into a) a synchronized access periodic ranging that is used if an uplink signal of terminal lies within a synchronization limit in accessing RACH, and b) a non-synchronized access periodic ranging used if the uplink signal fails to lie within the synchronization limit.

Asynchronous mode is similar to the periodic ranging. A terminal accesses RACH to report its modifications to a base station and to have resources allocated thereto. On the other hand, synchronous mode mitigates restriction of a guard time from RACH in accordance with assumption that a terminal does not deviate from uplink synchronization with a base station. Hence, more frequency-time resources are usable. And, a considerable size of message (over 24 bits) is sent in this mode by being added to a random access preamble sequence in 3GPP LTE.

When handoff occurs in the mobile terminal 100, the terminal is able to transmit information on the handoff via RACH. And, the terminal is able to allocate information related to a smoothness of downlink channel reception (DL resuming) or uplink channel transmission (UL resuming) within the RACH.

The controller 180 is able to display currently available networks for the mobile terminal 100. A user is then able to select a network to apply to data communication from the displayed networks [S20].

In particular, the controller 180 is able to set a network for data communication to a network selected from the currently available networks via an input of the user input unit 130.

Figure 7:
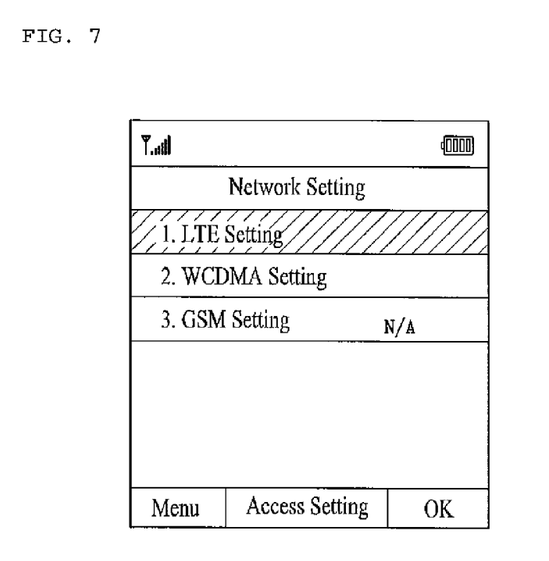
FIG. 7 is a diagram of a screen to explain an example that a specific network for data communication is set up in a mobile terminal according to one embodiment of the present invention.

FIG. 7 is a diagram of a screen to explain an example that a specific network for data communication is set up in a mobile terminal according to one embodiment of the present invention.

Referring to FIG. 7, the controller 180 is able to display networks supportable in the mobile terminal 100. In particular, the controller 180 is able to display the networks by discriminating currently available networks and non-available networks from each other. For instance, since a network associated with 'GSM' is not currently available, the device is able to mark 'N/A' in a displayed GSM item. In this case, the 'N/A' may indicate 'Not Available'. And, the controller 180 is able to select a specific network by moving a highlight thereto.

According to one embodiment of the present invention, the controller 180 is able to scan currently available networks based on a current location. The controller 180 is able to scan other available networks except the network currently set for data communication based on the idle cycle.

The controller 180 is able to determine the status of other available networks by exchanging data with a base station corresponding to the network currently set for the data communication during the active time and by receiving system information on other available network from the corresponding network during the idle time.

For instance, the controller 180 carries out data communication with a base station associated with LTE network (i.e., network currently set for the data communication) during the active time and receives system information on WCDMA network during the idle time from the WCDMA network. In this case, the system information may include strength of signals exchanged between the corresponding network and the mobile terminal 100. And, the strength of the corresponding signal can be determined based on a data rate for transceiving data via the corresponding network.

Figure 8:
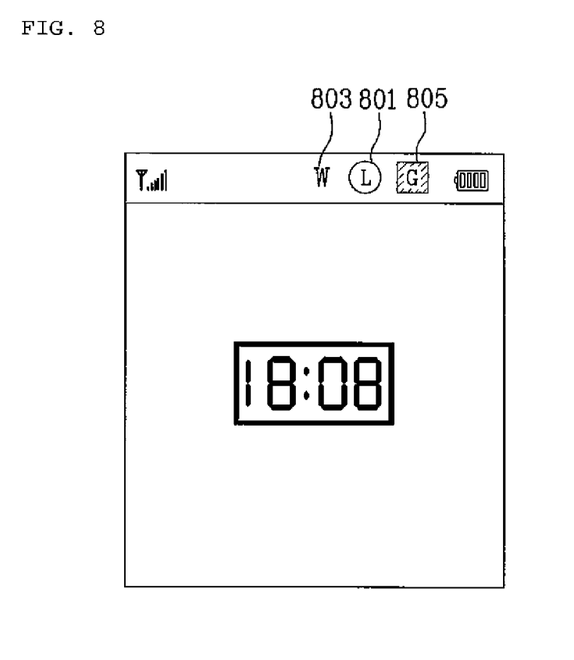
FIG. 8 is a diagram of a screen on which available networks are displayed in a mobile terminal according to one embodiment of the present invention.

Meanwhile, the mobile terminal 100 according to one embodiment of the present invention is able to display currently available networks in an indicator region. This example is shown in FIG. 8. FIG. 8 is a diagram of a screen on which available networks are displayed in a mobile terminal according to one embodiment of the present invention.

Referring to FIG. 8, networks applicable to the mobile terminal 100 are represented as abbreviations in an indicator region.

The controller 180 is able to represent WCDMA as 'W', LTE as 'L' and GSM as 'G'. And, the controller 180 is able to display currently available networks and currently non-available networks by visually discriminating the available/non-available networks from each other. For instance, currently available networks 801 and 803 are not hatched (shaded) and a currently non-available network 805 is hatched. Thus, the currently available networks and the currently non-available network are discriminated from each other.

The controller 180 is able to display a network set for current data communication in a manner that discriminates the network set for the current data communication from other networks. For instance, the controller is able to put a mark 801 in a manner of presenting a circle in which an abbreviation of the network set for the current data communication is inserted. In case that LTE is currently set for data communication, the controller 180 is able to present a circle in which a letter 'L' is inserted.

And, the controller 180 is able to display a network currently set for data communication by flickering the displayed network.

Thus, the networks are displayed in the indicator region. This display enables a user to confirm the currently available network without a specific key operation or manipulation.

The controller 180 is able to perform data communication via the network selected by the user [S30]. The controller 180 may uniformly set a specific network for every service associated with the data communication. Alternatively, the controller 180 is able to set a different network for data communication for each specific service associated with the data communication.

The controller 180 is able to display a strength of signal, which is transceived between the mobile terminal 100 and a base station corresponding to a specific network, for each service. This example is shown in FIGS. 9(a) and 9(b). FIGS. 9(a) and 9(b) are diagrams of a screen on which strength of a signal per a service used for data communication in a mobile terminal according to one embodiment of the present invention is displayed.

Figure 9:
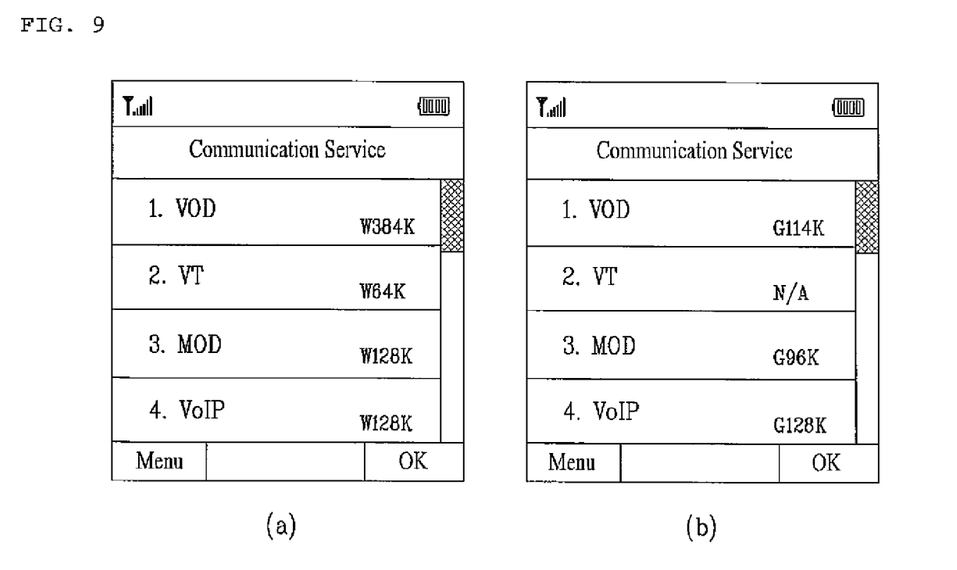

Referring to (a) of FIG. 9, a strength of signal transceived between the mobile terminal 100 and a WCDMA base station (base station established to be applied to WCDMA network) is displayed for each service associated with data communication. In this case, 'VOD' indicates a video service that provides a video based service such as movies, news and the like via telephone line or cable in accordance with a demand of a service user. 'VT' indicates a service enabling video communication. 'MOD' indicates a service enabling a specific music file to be downloaded or played. And, 'VoIP' indicates a service enabling a call via Internet.

In an example of performing data communication via WCDMA network, when a user performs the data communication using 'VOD' service, one can observe that a data rate (or strength of signal transceived with a base station) is 384 Kbps. When data communication is performed using 'VT' service, one can observe that a data rate (or strength of signal transceived with a base station) is 64 Kbps. Hence, a user is able to set a network suitable for each service with reference to the data rate.

Referring to (b) of FIG. 9, a strength of signal transceived between a GSM base station (base station established to be applied to GSM network) and the mobile terminal 100 is displayed for each service associated with data communication.

In case that a specific service is not available for a specific network, the controller 180 is able to display a non-available service to be discriminated from others. For instance, in case that a VT service is currently unavailable via GSM network, the device is able to mark 'N/A' within a displayed VT item. In this case, the 'N/A' is usable as a sign for 'Not Available'.

According to one embodiment of the present invention, the mobile terminal 100 is able to set a priority of a network applicable to each service used for data communication. This example is shown in FIGS. 10(a) and 10(b). FIGS. 10(a) and 10(b) are diagrams of a screen to explain an example of setting a priority of a network applicable to a specific service in a mobile terminal according to one embodiment of the present invention.

Figure 10:
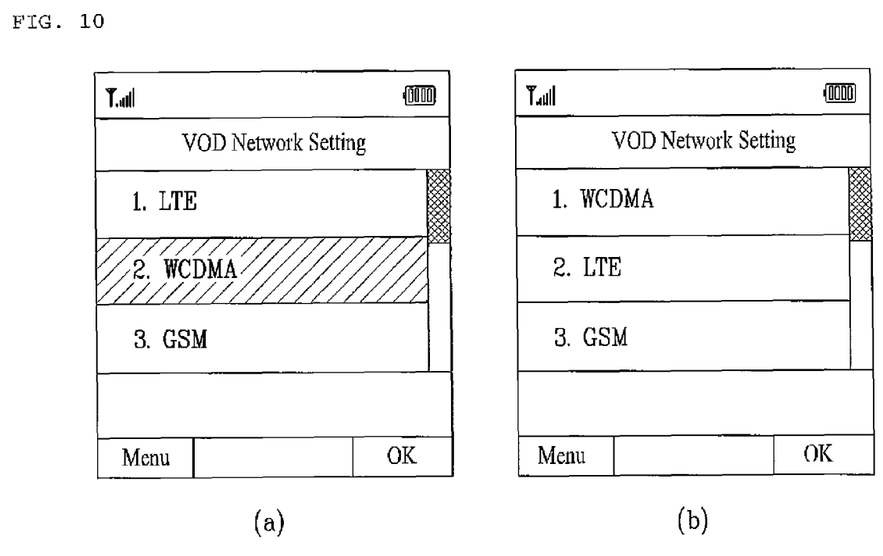

Referring to (a) of FIG. 10, priorities of networks applicable to 'VOD' service are set to the sequence of LTE, WCDMA and GSM. In this case, a user is able to change the priorities of the networks applicable to the 'VOD' service in order shown in (b) of FIG. 10. In particular, in case that the screen includes a touchscreen, the screen is able to change the priorities of the networks by a touch input.

According to one embodiment of the present invention, the mobile terminal 100 is able to set a presence or non-presence of access availability for each network applicable to data communication.

Figure 11:
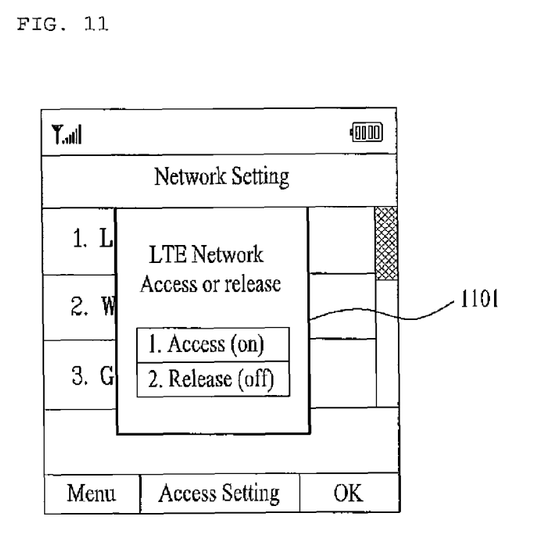
FIG. 11 is a diagram of a screen to explain an example of setting access or release for each network applicable in a mobile terminal according to one embodiment of the present invention.

FIG. 11 is a diagram of a screen to explain an example of setting access or release for each network applicable in a mobile terminal according to one embodiment of the present invention.

Referring to FIG. 11, while a specific network is selected, if a signal relevant to an access setting displayed on a lower end of the screen is inputted, the controller 180 is able to display a popup window 1101 for setting access or release of a network.

If access of a specific network is set (ON), the controller 180 is able to receive system information on the network from a base station corresponding to the network in a manner of scanning the network even if the network is not currently set for data communication. If an access to a specific network is released (OFF), the controller 180 does not scan the corresponding network. Hence, if a specific network is not available in a specific region, a user releases an access from the unavailable specific network to reduce power consumption.

Figure 12:
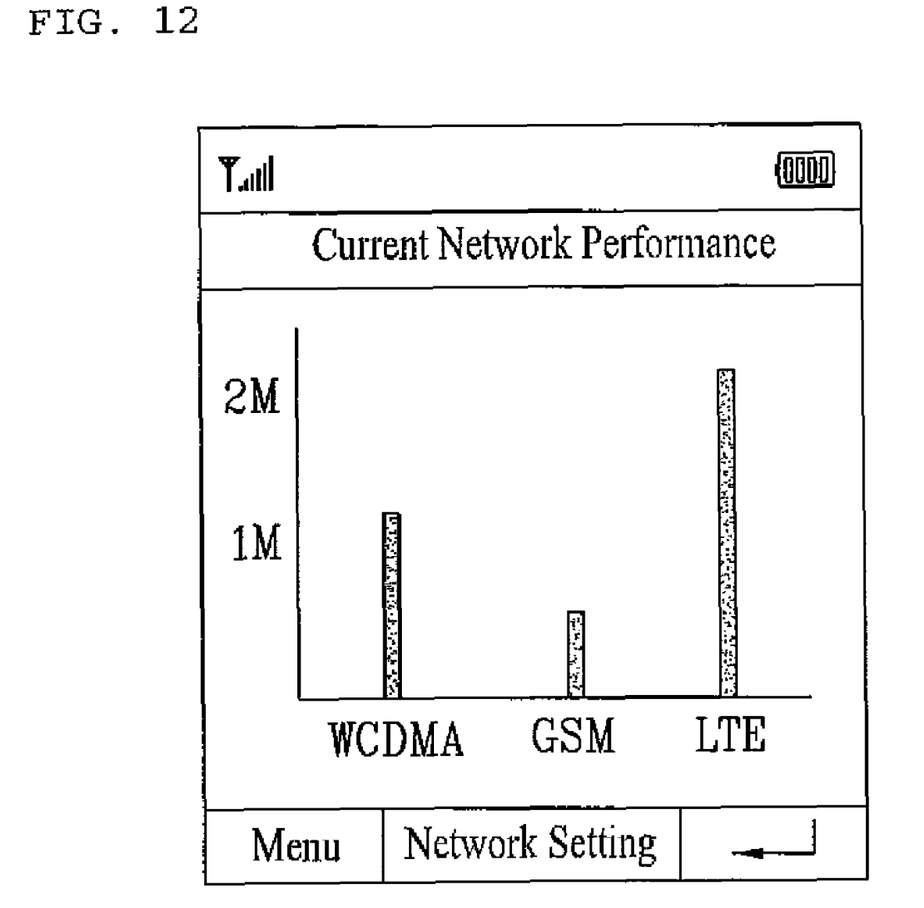
FIG. 12 is a diagram of a screen on which performance of a network applicable in a mobile terminal according to one embodiment of the present invention is displayed.

Meanwhile, the controller 180 is able to display a real-time performance state of a network applicable in the mobile terminal 100. This example is shown in FIG. 12. FIG. 12 is a diagram of a screen on which performance of a network applicable in a mobile terminal according to one embodiment of the present invention is displayed.

Referring to FIG. 12, the controller 180 is able to display performance of a network applicable in the mobile terminal 100 in a current mode. The performance of the network can be determined with various references. For instance, the performance of the network can be decided with reference to a data rate.

Meanwhile, according to one embodiment of the present invention, as a special situation such as handoff and the like takes place in the mobile terminal 100, if a currently used network becomes no longer available, the controller 180 is able to control data communication to be carried out via another currently available network [S40, S50]. For instance, the controller 180 is able to control the communication to be automatically carried out via a network having best communication performance. The automatic shift of networks may be accompanied by a visual, audible or tactile (e.g., vibration) alert to the user.

In any of the preceding embodiments, various text screens regarding the available or nonavailable networks may also be automatically presented or accessed through user input. Data available via these text screens may include a service provider name, usage cost information, signal strength, or other network related parameters.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the mobile terminal.

Accordingly, a mobile terminal of the present invention is able to perform communication with a network selected by a user input from a plurality of available networks.

One skilled in the art will understand that various modifications and variations can be made in the present invention without departing from the spirit or scope of the inventions.

Thus, the present invention covers the modifications and variations of this invention provided they come within the scope of the appended claims and their equivalents.

What is claimed is:

1. A multimode mobile terminal, comprising:
a display unit;
a user input unit;
a wireless communication unit;
and a controller operatively connected to the display unit, user input unit and wireless communication unit, the controller configured to
display a list of services associated with data communication,
scan for currently available networks based on a current location of the terminal;
set a specific network for each of the services among a plurality of available networks in response to a user input, each network being a different network type;
determine at least one active service of the services; and
wirelessly communicate, via at least one specific network, each of the at least one specific network corresponds to the at least one active service, and
while displaying the list of services:
display a plurality of currently available networks on an indicator region of a display unit, and
display a strength of a signal, which is transceived between the mobile terminal and a base station corresponding to the specific network, for each of the services among the plurality of available networks,
wherein the indicator region is displayed on a predetermined region of the display unit during a standby mode.

2. The multimode mobile terminal of claim 1, wherein the controller is configured to transmit on a random access channel of the specific network to a corresponding base station.

3. The multimode mobile terminal of claim 1, wherein the controller is configured to cause the display unit to display at least one currently non-available network along with the plurality of currently available networks, and to discriminate between currently available and currently non-available networks.

4. The multimode mobile terminal of claim 3, wherein the controller is configured to set a priority of each network for a specific service in response to a priority setting command inputted via the user input unit.

5. The multimode mobile terminal of claim 1, wherein the strength of the signal for each of the services is represented as an indicator.

6. The multimode mobile terminal of claim 4, wherein the controller is configured to set an access or to release the access for each of the plurality of currently available networks.

7. The multimode mobile terminal of claim 4, wherein the controller is configured to automatically shift the specific service to another of the plurality of currently available networks if a network currently used for the specific service becomes no longer available.

8. The multimode mobile terminal of claim 1, wherein the plurality of available networks comprise:
a GSM (global system for mobile telecommunication) network, a WCDMA (wideband code division multiple access) network, and a LTE (long term evolution) network.

9. A communication method of a multimode mobile terminal, comprising:
displaying, by the multimode mobile terminal, a list of services associated with data communication;

scanning for currently available networks based on a current location of the terminal;

setting, by the multimode mobile terminal, a specific network for each of the services among a plurality of available networks in response to a user input, each network being a different network type;

determining, by the multimode mobile terminal, at least one active service of the services; and wirelessly communicating, by the multimode mobile terminal and via at least one specific network, each of the at least one specific network corresponds to the at least one active service, wherein the step of displaying comprises displaying a plurality of currently available networks on an indicator region of a display unit, and displaying a strength of a signal, which is transceived between the mobile terminal and a base station corresponding to the specific network, for each of the services among the plurality of available networks, and wherein the indicator region is displayed on a predetermined region of the display unit during a standby mode.

10. The method of claim 9, wherein the step of wirelessly communicating comprises:

transmitting information on a random access channel of the specific network to a corresponding base station.

11. The method of claim 9, wherein the step of displaying comprises:

displaying at least one currently non-available network along with the plurality of currently available networks; and discriminating between currently available and currently non-available networks.

12. The method of claim 11, further comprising:

setting a priority of each network for a specific service in response to a user's priority setting command.

13. The method of claim 9, wherein the strength of the signal for each of the services is represented as an indicator.

14. The method of claim 12, further comprising:

setting an access or releasing the access for each of the plurality of currently available networks.

15. The method of claim 12, further comprising:

automatically shifting the specific service to another of the plurality of currently available networks if a network currently used for the specific service becomes no longer available.

16. The method of claim 9, wherein the plurality of available networks comprise:

a GSM (global system for mobile telecommunication) network, a WCDMA (wideband code division multiple access) network, and a LTE (long term evolution) network.

* * * * *